Figure 1:
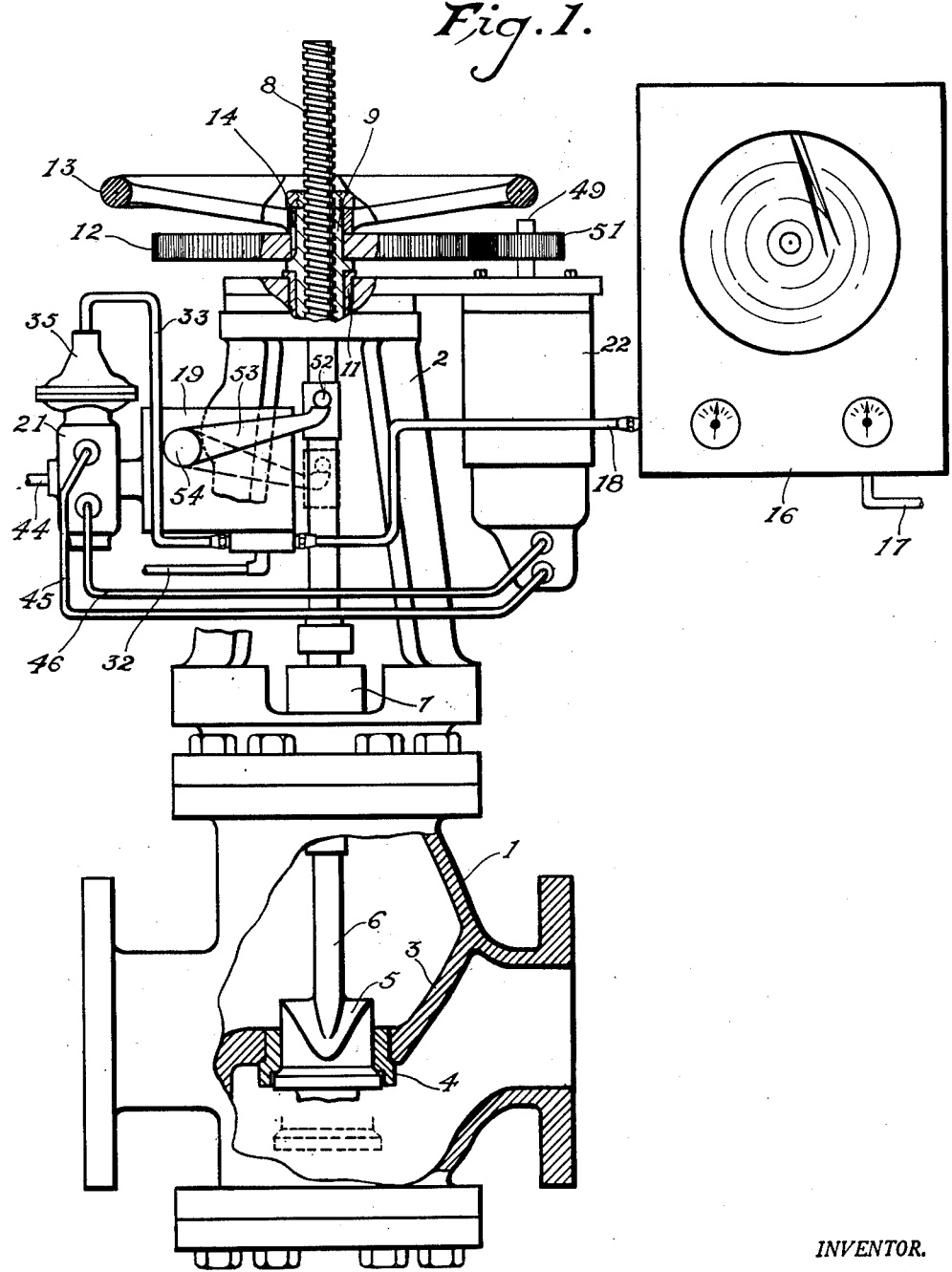

Nov. 4, 1952     R. B. WEREY     2,616,448
CONTROL SYSTEM

Filed Oct. 8, 1949     2 SHEETS—SHEET 2

INVENTOR.
Rudolph B. Werey
BY
E. Wellford Mason

Patented Nov. 4, 1952

2,616,448

UNITED STATES PATENT OFFICE 2,616,448

CONTROL SYSTEM

Rudolph B. Werey, Philadelphia, Pa., assignor to Conoflow Corporation, Philadelphia, Pa., a corporation of Pennsylvania Application October 8, 1949, Serial No. 120,327

12 Claims. (Cl. 137—656)

The present invention relates to control systems for controlling the value of a variable condition such as temperature, pressure, or flow, and more particularly to a means for adjusting a valve that regulates the flow of a condition varying medium.

One of the most widely accepted control systems in use today is the proportional type of pneumatic control. In such a system a control instrument varies the pressure of a supply of air in accordance with condition changes and this pressure is applied to a valve to adjust the same. Ordinarily the valves used with such a system are of the diaphragm or piston type, and are biased in one direction by a spring or weight and moved against this bias by the application of air pressure. Thus, it will be seen that for each increment of static loading on the diaphragm, for example, there will be a given position of the valve stem. The force that is available to move the valve stem is directly proportional to the area of the diaphragm or piston. Consequently when large valves requiring considerable force are used, large areas and large volumes of air are required.

Any slight change in the value of the variable being measured by the instrument is recognized and an almost instantaneous correction in its output pressure is made. There is, however, an inevitable time lag before this pressure change can be translated into a new position for the valve stem. This is particularly true if a large volume of air is required to make the change. Another factor entering into the proper positioning of a valve is changes occurring in external forces applied to the valve stem to change its position. While it is true that any change of position of the valve stem by any force other than an adjustment called for by the control instrument will produce a pressure change in the air applied to the diaphragm, the time factor for making the required correction is objectionable.

Another weakness encountered in fluid loaded valves of the diaphragm type is that their position becomes indeterminate upon failure of the air supply. Since they have a normal bias in one direction they will move to fully open or fully closed position. With a piston operated valve the stem will move in the direction determined by the external load. This means that the process being regulated may have to be shut down. If some means were available to hold the valve in its last adjusted position, operation of the process could generally be continued while the air supply was being restored.

Diaphragm or piston operated valves have definite limitations as to power, length of stroke, accuracy of positioning and general adaptability. There is need for a valve operator which will combine the features of practically unlimited power, unlimited length of stroke, extreme accuracy of intermediate positioning and ease of adaptability to a variety of industrial control elements such as valves, louvers, dampers, etc. An additional feature is urgently required, namely, that the stem of the operator remains in its last position in case of sudden failure of the operating fluid, namely, the air supply. It is impractical to build this feature into presently available valve operators using static loading methods.

In accordance with the present invention fluid loading to oppose the force of a spring or weight to position a valve is discarded. In its place is substituted a high torque, low inertia motor, preferably but not necessarily, pneumatic, for positioning a valve stem by rotary motion. Such a system is highly desirable and an improvement over the conventional systems because the stem of the valve is at all times locked in position and cannot be changed, even momentarily, by external load changes applied to the valve stem. The stem position of the valve cannot be changed from its last position in the event of failure of the fluid supply or other valve operating medium.

An additional advantage of the present system is that the power supply for operating the valve is practically unlimited. The actual operation of the valve is obtained through a servomechanism that is not limited to the low pressures generally used in pneumatic control systems. Also the gear ratio between said mechanism and the valve stem may be changed as necessary to vary the speed and thrust of valve stem.

It is an object of the present invention to provide an air control system in which a valve is adjusted by rotary motion of a valve positioning mechanism. It is a further object of the invention to provide a valve positioning system in which there is practically unlimited power available for positioning the valve.

Another object of the invention is provision of a system for positioning a valve in response to variations in a pneumatic pressure in which the last adjusted position of the valve will not be altered if the operating supply pressure should fail. It is also an object of the invention to provide a system in which the valve stem is moved by either pneumatic, hydraulic, or electric motor means in response to variation in a pneumatic pressure.

It is a further object of the invention to provide a valve operating system in which the valve stem may be moved positively in very small increments. This movement is accurately obtained by a self-balancing system in which the actuating pressure is always brought to a predetermined value. Any deviation of the pressure from this value, no matter how small, within the sensitivity of the system produces a corrective movement of the valve stem. The valve has a definite position for each increment of pressure applied to it whether the valve is opening or closing.

The various features of novelty which characterize the invention will be pointed out in the claims annexed to and forming a part of this specification. For a better understanding of the invention, however, its advantages, and specific objectives obtained with its use, reference should be had to the accompanying drawings and descriptive matter in which there is described a preferred embodiment of the invention.

Figure 2:
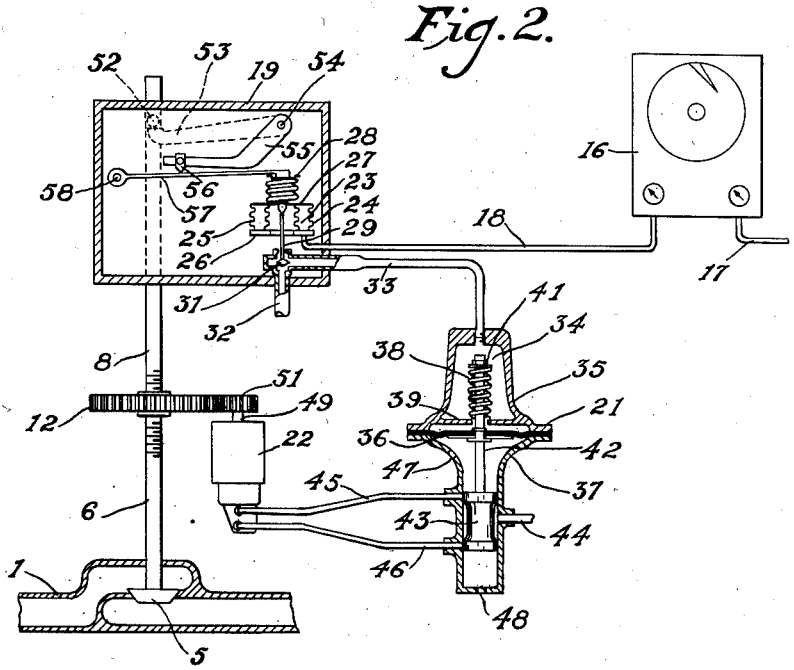
Figures 3, 4:
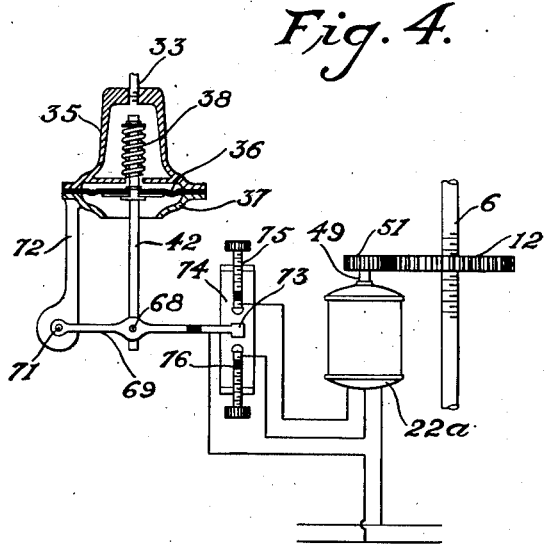

In the drawings:

Fig. 1 is a view showing the parts which comprise the control system and their relation to each other, Fig. 2 is a diagrammatic view, partly in section, showing details of various of the elements of the system, Fig. 3 is a view showing means for regulating the travel of a valve stem having a long travel, and Fig. 4 is a view showing the manner in which an electrically driven valve stem may be controlled.

Referring first to Fig. 1, there is shown a valve body 1 having a framework or yoke 2 attached thereto upon which the operating mechanism is mounted. The valve may be of any desired type and the operating mechanism may have any necessary length of travel. For purposes of this description, however, the valve will be described as being of the piston type. To this end the valve body is provided with a partition 3 having an opening therein receiving a seat 4. Movable within the seat 4 is a valve plug 5 having the desired flow characteristics for the application in which the valve is to be used. The valve plug is mounted on the lower end of a stem 6 that extends upwardly through a suitable packing 7 to and through the top of the yoke 2. At its upper end stem 6 is threaded as at 8 and is received in a similarly threaded bushing 9 that is journaled for rotation, but is held against axial movement, in a bearing sleeve 11 in the upper end of the yoke. Bushing 9 can be rotated to shift stem 6 axially and vary the opening of the valve either by a gear 12 or a handwheel 13, both of which are keyed to the bushing by a key 14. If desired, any conventional clutch (not shown) may be inserted between handwheel 13 and bushing 9 so that the handwheel is not necessarily driven when the valve is being adjusted by gear 12.

The present invention relates particularly to the mechanism by means of which the gear 12 may be rotated automatically in either direction in response to variations in the value of a condition. This condition may be controlled by fluid flowing through the valve, and will be so described.

There is shown at 16 a conventional pneumatic control instrument responsive to the value of a variable condition that is to be maintained at some constant value. Such an instrument has supplied thereto, through tubing 17, air under a regulated pressure of say seventeen p. s. i., and operates in a well-known manner to vary an output pressure in a tube 18 in proportion to variations in the value of the condition under control from the set point. Therefore, as the value of the condition varies in one direction or the other from that desired, the output pressure in tube 18 will be proportionally varied from a median value through a range of, for example, two to sixteen p. s. i. This pressure is applied through a follow-up type of amplifying device 19 to a power controlling device 21. The latter controls the application of power, either pneumatic, hydraulic or electric, to a reversible motor 22 which drives gear 12. Each of these devices and its operation will be described below.

Referring now to Fig. 2, it will be seen that the pressure in tube 18 is applied to the interior of an expansible chamber 23 formed between a pair of bellows 24 and 25 that are attached at their lower ends 26 to the casing of device 19. As the pressure in chamber 23 increases its movable end 27 will be raised against the force of a spring 28 bearing against it. If the pressure in the chamber is reduced spring 28 will move end 27 downwardly. As the end 27 of chamber 23 is shifted in position, it moves pilot valve 31 by means of stem 29 through its travel. When pilot valve 31 is in its upper position, pressure from supply tube 32 is applied to output tube 33; when pilot valve 31 is in its lower position, supply is cut off and tube 33 is vented to atmosphere. The supply in tube 32 may be from the same source as that to tube 17, or may be at a different pressure if desired.

The pressure in tube 33 is applied to controlling device 21 which controls the power supply to valve driving motor 22. Device 21 includes a chamber 34 formed between a cap 35 and a flexible diaphragm 36 fastened to a frame 37. The diaphragm is normally biased upwardly against the force exerted by the pressure in chamber 34 by a spring 38. This spring has its lower end resting on a cradle 39 extending inwardly from cap 35, and has its upper end bearing against an abutment 41 fastened to a shaft 42 that is fixed to a diaphragm 36. The lower end of shaft 42 carries a piston valve 43 which controls, in this case, the flow of a high pressure fluid supply from pipe 44 to either pipe 45 or pipe 46.

When diaphragm 36 moves downwardly piston 43 is shifted so that fluid can flow from the source of supply through pipe 44 to pipe 46. Fluid can exhaust from pipe 45 past the upper end of piston 43 to the atmosphere, or a drain through an opening 47 in the frame 37. In a like manner, when the piston moves upwardly fluid can flow from pipe 44 to pipe 45, and fluid is exhausted to atmosphere or a drain from pipe 46 through an opening 48 in the bottom of the frame.

Motor 22, operating the valve is a high torque, low inertia, fluid-driven motor. These characteristics may be obtained in a commercially available fluid motor of the well-known piston type, wobble-plate type, and motor 22 is preferably such a motor. Any other motor having the desired characteristics may, however, be used. Assuming that the motor 22 is a wobble-plate motor, it will be so connected that when fluid is admitted through pipe 45, the motor will rotate in a direction to raise stem 6 and open the valve 5. In like manner when fluid is admitted through pipe 46 the motor will be rotated in a direction to lower stem 6 and close the valve. Operation of the motor is imparted through its shaft 49 to a pinion 51 fixed thereto which meshes with and drives the gear 12 that operates the valve stem.

As the valve stem moves downwardly it acts through a pin 52 projecting outwardly therefrom to move a lever 53 counter-clockwise in Fig. 2 around its pivot 54 in a wall of casing 19. Fastened to move with lever 53 is a lever 55 on the inside of the casing that has on it a slider 56 which bears against the upper surface of a third lever 57. The third lever 57 is pivoted for movement around its left end at 58, and bears with its right end against the upper end of spring 28. Therefore as the valve stem 6 is moved it acts through the lever system to change the force of spring 28 to oppose the pressure changes applied to chamber 23. Slider 56 can be shifted along lever 55 to vary the amount of movement imparted to lever 57 for given movement of lever 55. Normally the slider is adjusted to a position depending upon the distance stem 6 must travel to move the valve from fully open to fully closed position.

In describing the operation of the system it may be assumed that the value of the condition under control has increased, and that the valve must be moved toward closed position to bring the condition back to its set point. As the condition increases in value control instrument 16 will increase its output pressure in pipe 18 a proportional amount. This increased pressure will be applied to chamber 23 to move wall 27 upwardly against the force of spring 28. This moves pilot valve 31 upwardy to close the upper port to atmosphere, and permit air to flow from line 32 into line 33 and thus increase the pressure in chamber 34 of the power controlling device 21.

The increase in pressure in chamber 34 will move diaphragm 36 downwardly against the force of spring 38, and will also move piston valve 43 downwardly. As the piston uncovers the ports leading to pipes 45 and 46, fluid will be admitted to the latter to drive motor 22 in a direction to move valve stem 6 downwardly and thus close the valve 5. The valve stem will continue to move at high speed as long as the pipe 46 is connected with the high pressure fluid supply from pipe 44.

As the valve stem 6 moves downwardly pin 52 projecting therefrom will move levers 53 and 55 in a counterclockwise direction in Fig. 2. This movement is imparted through slider 56 to lever 57 to compress spring 28. Wall 27 of the chamber 23 is moved downwardly by the spring thereby causing valve 31 to cut off the air supply from pipe 32 and permit air to bleed from pipe 33 to the atmosphere. Eventually the pilot valve will be adjusted to a position where the pressure in chamber 34 is back to its original value and piston valve 43 again obstructs the ports leading to pipes 45 and 46. At this time adjustment of the valve stem will stop since activating fluid to motor 22 is cut off. The system is then stable with the valve in a new position corresponding to the new value of the condition measured by the instrument 16.

If the value of the condition under control had decreased the pressure in chamber 23 would have been reduced. Valve 31 would thereby move downwardly under the action of spring 28 to vent line 33 and chamber 34 to the atmosphere. In this case pipe 45 will be connected to the high pressure fluid in pipe 44 to drive motor 22 in a direction to open valve 5 with an upward movement of the valve stem 6. This continues until the pressure on the spring 28 is reduced enough for the pilot valve 31 to raise and permit the pressure in chamber 34 to increase to its original value. The force on the diaphragm will then exactly equal the force of spring 38 and will move to its mid-position to shut off pipe 45.

From the above it will be seen that the valve stem is moved to a new position for each different output pressure of the primary control instrument 16. The operation of the valve is dynamic in that a positive application of power is required to move it in each direction, rather than static wherein one force is used to balance a second force.

If it is assumed, for example, that spring 38 of power controlling device 21 has a range from two to ten p. s. i., then its neutral position will be at the half-way mark in this range or approximately six p. s. i. Therefore the output of the pilot device 19 will be at this value for stable conditions. Any deviation from this value will cause deflection of diaphragm 36 and movement of piston 43 to open the port leading to one or the other of pipes 45 and 46. The motor 22 will operate the valve until the stem thereof is adjusted enough to bring the output pressure of the pilot device back to the same neutral value. The sensitivity of the device can be adjusted in several ways. One of these is to substitute a spring 38 with a different rate so that it will deflect more or less for a given pressure change. The preferred method of adjusting the sensitivity, however, is to vary the overlap of the cylindrical ends known as "lands" of piston 43 with respect to the ports leading to pipes 45 and 46. In this way more or less movement of the piston is required before motor 22 is started in operation.

In any event the motor will start to operate as soon as one of the pipes leading thereto has fluid from source 44 flowing through it. As soon as the valve is correctly positioned for the output pressure of instrument 16, or when the pressure on diaphragm 36 is returned to its neutral value the motor stops. As mentioned above, motor 22 is preferably of the wobble-plate type, and may be either pneumatic or hydraulic. The low inertia, high torque characteristics of such a motor are valuable because of the rapidity with which it can start and stop. The pressure of the fluid, either air or liquid, supplied to the motor can be in the range of ninety-five to one hundred p. s. i. or lower, if desired.

Inasmuch as the stem 6 of the valve is threaded and is gear driven it is continuously locked in its adjusted position, and cannot be disturbed even momentarily by external load changes. Furthermore the stem position of the valve will not be moved from its adjusted position in the event of failure of the fluid supply. This is particularly important in many processes, and cannot be obtained in any other type of pneumatic control system. The power output of the system is practically unlimited. By simply changing the gear ratio between motor 22 and gear 12 or the substitution of a more powerful motor even the largest valves may be operated.

The valve described above is one which has a comparatively short stem movement between open and closed positions. For this reason the movement of the stem can be used directly to operate the lever system of the valve positioner or amplifying device 19. In many cases, however, it is necessary to use a valve having a much longer stem travel than can be handled by the lever system of device 19. For valves having a long stem travel the arrangement shown in Fig. 3 may be used.

Referring to Fig. 3, there is shown a valve stem 6a having a member 61 mounted thereon. Attached to this member is one end of a tape 62, the other end of which is wrapped around and fastened to a drum 63 that is mounted for rotation at 64. This drum has a circumference substantially equal to the travel of the valve stem so that it is moved through almost a complete revolution as the valve is moving from open to closed position. It is noted that the drum is biased for rotation in a clockwise direction by any suitable means (not shown) and is moved against its bias as the valve stem moves upwardly. As drum 63 rotates it moves a cam 65 with it. Bearing on the surface of the cam is a roller 66 on one end of a lever 67 that is attached to the shaft 54 of device 19. The cam is so positioned with respect to drum 63 that when the valve is closed roller 66 bears against the low portion of the cam. As the valve is opened the drum 63 and cam 65 rotate in a counter-clockwise direction to lift roller 66 to move shaft 54 in a direction to decrease the force of spring 28 on the movable end 27 of chamber 23 in a manner previously described. The radius of cam 65 changes enough between its high and low portions to move the free end of spring 28 in device 19 through its full range.

It will be seen from the above description that the operation of the embodiment of Fig. 3 is identical to the operation of the embodiment previously described. The embodiment of Fig. 3, however, has a motion multiplying mechanism used in conjunction with the device 19 to accommodate a large valve movement such as would be required to operate a gate valve, for example. It will be obvious that drums of various sizes may be used for valves having various lengths of travel. It is also noted that cam 65 may be shaped to compensate for the non-linear characteristics of various valves if so desired.

The valve actuating motor 22 described above is fluid operated. In some cases it may be desirable to use an electric motor for actuating the valve, but still retain the inherent advantages of a pneumatic control system. This can easily be accomplished with the system of the present invention by having the power controlling device 21 operate a set of electrical contacts instead of a piston valve as previously described. Such a system will now be described with reference to Fig. 4.

Air is supplied through pipe 33 to vary the position of diaphragm 36 as in the previously described embodiment to shift rod 42 axially. The lower end of this rod is pivotally connected at 68 to a contact carrying lever 69 that is in turn pivoted at 71 on an arm 72 projecting downwardly from frame 37. The outer end of lever 69 has a contact 73 mounted on it which, when diaphragm 36 is in its mid-position, rests on a non-conducting portion of an arcuate shaped contact supporting piece 74. As the diaphragm 36 is moved contact 73 will be brought into engagement with either a contact 75 or a contact 76 that are connected respectively to the fields of a reversible valve adjusting motor 22a. Contact 73 is connected to one wire of an electric supply line, while the other side of the line extends directly to the motor.

In the operation of this embodiment, air pressure proportional to the value of the condition under control is applied through pipe 33 to diaphragm 36 in the manner previously described. Thus contact 73 is moved into engagement with either contact 75 or contact 76 depending upon whether the value of the condition is falling or rising respectively. Upon closing of the contacts a circuit is completed through one field of motor 22a to drive it in a direction to adjust properly the valve stem 6 for the condition change. The valve stem in this case also serves to readjust the pressure applied to diaphragm 36 to its neutral value so that contact 73 is brought to its mid-position when the valve is properly positioned. Motor 22a can be of any suitable type having high torque, low inertia characteristics.

In this form of the invention the sensitivity of device 21 can be changed either by adjusting the position of pivot 72 or by varying the spacing between contacts 75 and 76 on their support 74. While the contacts have been described as being connected directly in the motor field circuits, it will be readily apparent that the contacts may be used to control suitable relays if desired.

From the above description it will be seen that there is provided a control system in which a combination of elements is arranged to produce an unusually sensitive valve adjustment. The system incorporates all of the desirable characteristics that are inherent in pneumatic control. In addition the system provides a positive, powerful valve adjusting movement with provision to maintain the valve in adjustment in the event of power failure.

The volume of air required to move chamber wall 27 and diaphragm 36 is relative small so that a quick response is obtained. This response is transmitted without lag to piston 43 or lever 69 so that power is supplied to the valve adjusting motor almost immediately. Consequently the condition changing medium flowing through the valve is regulated to its new value, corresponding to the value of the condition under control, before the latter has departed from its set point sufficiently to upset the process of which it forms a part.

While in accordance with the provisions of the statutes, I have illustrated and described the best forms of the invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a control system to operate a valve having a threaded stem, rotating means to move said stem and a reversible motor to drive said rotating means, the combination of a part having a mid-position and being movable in opposite directions from said mid-position to control a supply of power to drive said motor in opposite directions, a pressure responsive device connected in said part to move the same, means to bias said device in one direction, a source of fluid under pressure operative to move said device in the opposite direction, a pilot valve to control the application of fluid to said device, means operative in response to variations in the value of a condition to adjust said pilot valve, and means operated by said valve stem as it moves to neutralize the adjustment of said pilot valve made by said responsive means.

2. In a control system, the combination of a valve having a valve stem, rotary means to move said stem, a reversible motor to drive said rotary means, mechanism operative to control the application of a source of power to drive said motor in one direction or in a reverse direction, said mechanism including a part moved in opposite direction from a neutral position in which the application of said source of power in either direction is cut off, means to bias said part in one direction, means to apply a pneumatic pressure to said part to oppose said biasing means, said pressure having a normal value in which said part is held in its neutral position, means operative in response to the variations in the value of a condition to adjust said pressure from its normal value, and means operated by said valve stem as the valve stem moves to return said pressure to its normal value.

3. In a control system for a valve having a threaded stem, rotating means to adjust said stem and a reversible motor to drive said rotating means, the combination of a part having a mid-position and movable in opposite directions from said mid-position to control a supply of power to drive said motor in opposite directions, pressure responsive means connected to said part to move the same, means to bias said pressure responsive means in one direction, a supply of fluid under pressure connected to bias said pressure responsive means in the opposite direction, a pilot valve to control the pressure of said fluid supply, a normal value of pressure maintaining said part in its mid-position, means to move said pilot valve in response to variations in the value of a condition to thereby vary the pressure applied to said pressure responsive means and cause adjustment of said valve, and means operated by said valve stem as the valve stem moves to return said pilot valve to its original position.

4. In a control system, the combination of a valve having a threaded stem operated by a rotating type reversible fluid operated motor, a cylindrical member having ports therein leading to said motor through which actuating fluid may flow to drive said motor in opposite directions, a piston to block both of said ports or one or the other of them depending upon whether said piston is in a mid-position or on one side or the other thereof, a diaphragm connected to said piston to actuate the same, means to bias said diaphragm in one direction, pilot valve means to apply a regulated pressure to said diaphragm in opposition to said biasing means, means operative in response to variations in the value of a condition to adjust said pilot valve, and means moved by said valve stem as it is operated to readjust said pilot valve in opposition to adjustments made thereto by said responsive means.

5. In a control system, the combination of a valve having a threaded stem, rotatable gear means received by said stem, means to maintain said gear means against axial movement whereby as said gear means rotates said stem will be moved in an axial direction, a reversible motor connected to drive said gear means, means to control the application of power to said motor to produce rotation thereof in one direction or the other, a pressure responsive device to operate said control means, said device being movable from a neutral position in which no power is applied to said motor to a position on one or the other side of said neutral position in which power will be applied to drive said motor in one direction or an opposite direction, means to bias said device in one direction, pressure regulating means to apply a variable pressure to said device in opposition to said biasing means, means operative in response to the variations of a condition from a desired value to adjust said pressure regulating means and thereby vary the pressure applied to said device, and mechanism operated by said valve stem as it moves to adjust said pressure regulating means in opposition to the adjustment given the same by said responsive means.

6. The combination of claim 5 in which said motor is a fluid operated motor and said control means includes a cylindrical member having ports therein through which an actuating fluid can flow to drive said motor in opposite directions, a piston valve movable from said neutral position in which both ports are closed to either side thereof in which one port or the other is open to the actuating fluid, and means through which a source of actuating fluid under pressure can be supplied to said cylindrical member to flow through said first mentioned ports when they are open.

7. The combination of claim 5 in which said motor is an electric motor, conductors to supply electric power to the motor, and said control means includes a switching device inserted in said conductors.

8. The combination of claim 5 in which said motor is an electric motor and said control means is a switch operative to control the application of electric power to said motor as said control means is moved from said neutral position to a position on either side thereof.

9. The combination of claim 5 in which said mechanism includes a rotatable cam, means operated by said valve stem to rotate said cam through substantially a revolution as said valve moves from open to closed position, a pivoted lever moved by said cam as the latter rotates, and means operated by said lever to readjust said pressure regulator.

10. In a valve operating system, the combination of a valve having a threaded stem, a gear in threaded engagement with said stem, means to hold said gear from axial movement whereby as said gear is rotated said stem will be moved axially, a reversible fluid operated motor to drive said gear, pressure operated means to control the application of fluid under pressure to drive said motor, said means being movable in one direction from a neutral position to apply fluid to drive said motor in one direction, and in an opposite direction from said neutral position to apply fluid to drive said motor in the opposite direction, means to bias said pressure operated means in one direction, a pilot valve operative to apply a pressure to said pressure operated means in opposition to said bias, means responsive to variations in the value of a condition to adjust said pilot valve, and mechanism positively operated by said valve stem to readjust said pilot valve in opposition to the adjustment given thereto by said responsive means.

11. In a valve operating system, the combination of a valve including rotatable gears to open and close said valve, a reversible fluid operated motor to drive said gears, piston means movable in opposite directions from a neutral position to control the application of power to said motor to drive the same in opposite directions, a pressure responsive device connected to said piston means to move the same, means to bias said device in one direction from its neutral position, a pilot valve to control the application of pressure to said device to move it against the force of said biasing means, a normal pressure on said device holding it in its neutral position, condition responsive means to actuate said pilot valve to vary the pressure applied thereby to said device, and mechanism positively operated by said valve as it is adjusted to actuate said pilot valve in opposition to said condition responsive means.

12. In combination, a valve having a threaded stem, self locking rotary means to move said stem including a reversible fluid operated motor, a pressure operated device to control the application of fluid to said motor, said device having a mid-position in which no fluid is supplied to said motor and being movable to opposite sides of said mid-position to supply fluid to said motor to drive it in one direction or an opposite direction, means to bias said device in one direction, means responsive to changes in the value of a condition to apply pressure to said device in opposition to its bias, said pressure having a normal value at which said device is in its mid-position, and means positively operated by said valve stem upon movement thereof to actuate said responsive means to return the pressure applied thereby to said device to its normal value as the applied pressure changes from its normal value in response to condition changes.

RUDOLPH B. WEREY.

REFERENCES CITED

The following references are of record in the file of this patent:

UNITED STATES PATENTS

| Number | Name | Date |
| --- | --- | --- |
| 1,666,270 | Soderberg | April 17, 1928 |
| 1,764,936 | Dean | June 17, 1930 |
| 1,961,343 | Donaldson | June 5, 1934 |
| 1,962,676 | Albright | June 12, 1934 |
| 2,340,999 | Troth | Feb. 8, 1944 |